United States Patent Office 3,180,884
Patented Apr. 27, 1965

3,180,884
BICYCLIC PHOSPHORUS-CONTAINING ESTERS
AND PROCESS THEREFOR
Rudi F. W. Rätz, Hamden, Conn., assignor to Olin Mathieson Chemical Corporation, New Haven, Conn., a corporation of Virginia
No Drawing. Filed Oct. 5, 1962, Ser. No. 228,746
8 Claims. (Cl. 260—461)

This invention relates to a new series of phosphorus-containing esters, and more particularly it relates to a series of compounds having the following structural formula

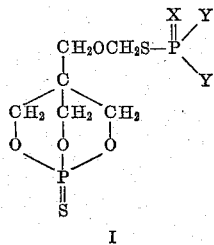

I wherein X is selected from the group consisting of oxygen and sulfur, and Y represents an alkyl group containing up to 18 carbon atoms, a phenyl group, or an alkoxy group having an alkyl substituent containing up to 18 carbon atoms.

One of the intermediates utilized in the work described herein is 1-hydroxymethyl-4-phospha-3,5,8-trioxabicyclo[2.2.2]octane-4-sulfide which is prepared in accordance with the process described in copending application Serial No. 205,205, filed on June 26, 1962, wherein pentaerythritol is reacted with thiophosphoryl chloride. This compound is represented by the following structural formula.

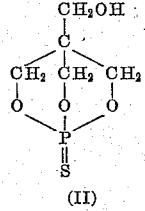

(II)

The principal object of this invention was to prepare a new series of phosphorus-containing esters. Another object of this invention was to utilize the above illustrated bicyclic alcohol as an intermediate in the synthesis of the aforementioned esters.

Still another object of this invention was to provide an efficient process for the preparation of a novel series of phosphorus-containing esters. Other objects will be apparent from the following discussion.

These objects have been accomplished in accordance with this invention. It has now been found that the chloromethyl ethers of the bicyclic alcohol (II) can be reacted with a wide variety of salts of derivatives of acids of phosphorus containing at least one sulfur atom bonded directly to a phosphorus atom. These reactions yield products having the structural Formula I.

For example, if the alcohol is reacted with paraformaldehyde and hydrogen chloride, a previously unknown chloromethyl ether is obtained which may be reacted as shown in the following equation.

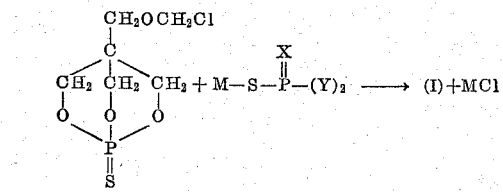

In the above equation M is an alkali metal, and X and Y have the same meaning as previously mentioned in referring to the structural Formula I.

Other chloromethyl ethers useful in the practice of this invention can be prepared by reacting the alcohol (II) with other compounds having a carbonyl group such as acetaldehyde, benzaldehyde, acetone, etc. in order to obtain chloromethyl ethers with varying groups substituted on the carbon atom bearing the reactive chlorine atom. These ethers can also be used in the process described herein to obtain other phosphorus-containing esters.

Among the compounds which can be reacted with the chloromethyl ethers, as indicated above, are the alkali metal salts of dialkyl dithiophosphoric acid. Lower members of this series such as the methyl, ethyl and isopropyl compounds are commercially available and higher alkyl substituted esters can be readily prepared by transesterification of dimethyl or diethyl dithiophosphoric acid with higher alcohols (containing up to 18 carbon atoms) in accordance with the method taught by S. Truchlik and J. Masek (Agrochem. Tech., Bratislava-Predmesti, Czech.). For example, if dimethyl dithiophosphoric acid is transesterified with n-octyl alcohol, the product dioctyl dithiophosphoric acid is obtained. Alkali metal salts of this acid can then be conveniently reacted with the chloromethyl ethers to give esters having two substituted octyl groups. Similarly lauryl alcohol and stearyl alcohol can be used in such transesterification procedures, and, as a result, phosphorus-containing esters having alkyl substituents with 12 and 18 carbon atoms are obtained in accordance with the described methods herein.

Other compounds which can be reacted with the chloromethyl ethers are the alkali metal salts of dialkyl thiophosphoric acid which can be prepared in accordance with the method of V. G. Pesin et al. in J. Gen. Chem. USSR, 1961, 31, No. 8, 2337.

Similarly, the alkali metal salts of alkyl or aryl dithiophosphinic acids and dithiophosphonic acids may be reacted with the chloromethyl ethers to give compounds included in the structural Formula I. For example, the alkali metal salts of dialkyl dithiophosphinic acids, prepared in accordance with the method described by Malatesta, Gazz. Chem. Ital. 77, 509, 1947, can be used in the reaction. Also, the alkali metal salts of dialkyl thiophosphinic acids may be used in the reaction. These acids may be prepared by the methods of Strecker and Grossmann, Ber. 49, 63 (1916).

The following examples will serve to illustrate the novel compounds and process of this invention. These examples are illustrative only, and are not to be considered as limiting the scope of this invention.

Example 1

Into a reaction flask equipped with stirrer was placed 49.5 g. of 1-hydroxymethyl-4-phospha-3,5,8-trioxabicyclo-[2.2.2]octane-4-sulfide. A liter of benzene was added, and then 8.6 g. of paraformaldehyde was added to the suspension in the flask. A stream of hydrogen chloride gas was passed into the reaction mixture with stirring at room temperature until most of the solid material went into solution. A very small amount of a smeary residual material remained undissolved and was removed from the reaction mixture by filtration. The clear solution was allowed to stand, and after two hours crystallization began to occur. After filtration at this point, 11.5 g. of a crystalline material having a melting point of 155–57° C. was obtained. The filtrate was then allowed to stand for two days, and a second crop of 16.7 g. of absolutely colorless crystals, M.P. 156–58° C. was isolated. A third crop of 23.4 g. of colorless crystals was collected by evaporation of the benzene mother liquor to dryness. The three crops were combined and recrystallized from xylene. Colorless plates having a very sharp melting point of 157.5°–158° C. were collected. An 83.3% yield of the desired chloromethyl ether was obtained.

*Analysis.*—Calcd. for $C_6H_{10}O_4PSCl$: C, 29.44; H, 4.12; P, 12.68; Cl, 14.50. Found: C, 29.75; H, 4.24; P, 12.51; Cl, 13.96.

Example 2

A solution of 4.89 g. (.02 mole) of the chloromethyl ether of Example 1 was obtained by gently heating the material in 40 ml. of acetonitrile at 35° C. Then a solution of 4.10 g. (.02 mole) of ammonium diethyl dithiophosphate in 20 ml. of acetonitrile was also prepared, and added dropwise with stirring to the first solution at room temperature. A slight exothermic reaction occurred with immediate separation of ammonium chloride. The addition was completed within ten minutes. The reaction mixture was allowed to stand overnight before being filtered. Ammonium chloride (1.068 g.) was collected. The theoretical amount of ammonium chloride would be 1.07 g. assuming a quantitative yield of desired product. The filtrate was evaporated in vacuo to a clear viscous oil which crystallized on standing. The product consisted of 7.65 g. of a colorless solid, M.P. 69° C., which represents a 96.7% yield of desired product. The material could be recrystallized from carbon tetrachloride, but this same sharp melting point (69° C.) was obtained.

*Analysis.*—Calcd. for $C_{10}H_{20}O_6P_2S_3$: C, 30.41; H, 5.09; P, 15.72; S, 24.4. Found: C, 30.38; H, 5.51; P, 15.67; S, 25.9.

Example 3

To a solution of 4.89 g. (.02 mole) of the chloromethyl ether of Example 1 in 40 ml. of acetonitrile was added a solution of 5.047 g. (.02 mole) of potassium di-isopropyl dithiophosphate in 40 ml. of acetonitrile. The addition was dropwise at room temperature and was complete within a ten minute period during which potassium chloride precipitated from solution. After standing two hours, the mixture was filtered to remove salt. The filtrate was evaporated to dryness giving 8.4 g. of a colorless crystalline residue. This material was recrystallized from isopropanol, and long, colorless, shining needles, M.P. 116.5–117° C. were obtained. A yield of 97% of the desired product was obtained.

*Analysis.*—Calcd. for $C_{12}H_{24}O_6P_2S_3$: C, 34.20; H, 5.69; P, 14.71; S, 22.75. Found: C, 34.32; H, 5.80; P, 14.70; S, 22.60.

Example 4

To a solution of 4.89 g. (.02 mole) of the chloromethyl ether of Example 1 in 40 ml. of acetonitrile was added a solution of 3.74 g. (.02 mole) of the ammonium salt of O,O-diethyl thiophosphoric acid in 30 ml. of acetonitrile. Addition was completed within ten minutes at room temperature. The reaction mixture was allowed to stand overnight, and then 1.15 g. of ammonium chloride was collected by filtration. The filtrate was evaporated to dryness giving a clear colorless oil which crystallized immediately at room temperature. There was thus obtained 7.5 g. of crystalline material which upon recrystallization from ethanol gave colorless needles, M.P. 95° C. A yield of over 98% of desired product was obtained.

*Analysis.*—Calcd. for $C_{10}H_{20}O_7P_2S_2$: C, 31.75; H, 5.28; P, 16.36; S, 16.80. Found: C, 31.65; H, 5.21; P, 16.4; S, 16.83.

Infrared analysis confirmed the presence of the characteristic P=O group in the crystalline product.

Example 5

To a solution of 4.43 g. (.0182 mole) of the chloromethyl ether of Example 1 in 40 ml. of acetonitrile was added a solution of 3.21 g. (.0182 mole) of ammonium-O,O-dimethyl dithiophosphate in 80 ml. of acetonitrile. Addition was performed at room temperature, and was completed within ten minutes. The reaction mixture was allowed to stand at room temperature overnight, and then 1.2 g. of ammonium chloride was removed by filtration. The filtrate was then evaporated to dryness, and a colorless, oily residue was obtained which solidified to a crystalline cake within one hour at room temperature. There was thus obtained 6.45 g. of crystalline material which upon recrystallization from methanol gave colorless small crystals, M.P. 94.5° C. A yield of over 97.5% of desired product was obtained.

*Analysis.*—Calcd. for $C_8H_{16}O_6P_6S_3$: C, 26.22; H, 4.38; P, 16.98; S, 26.22. Found: C, 26.62; H, 4.47; P, 16.90; S, 26.22.

The foregoing examples illustrate the smoothness with which the reactions described herein proceed. Nearly quantitative yields of the desired esters are consistently obtained. The process described is extremely convenient and does not involve prolonged reaction periods or difficult purification techniques. The products are obtained in high purity as shown by the analytical data.

Equimolar quantities of chloromethyl ether and alkali metal salt should preferably be employed in the process. Excess amounts of either reactant may be used if desired for some reason, but there is no necessity for using additional quantities in view of the rapidity with which nearly quantitative yields are obtained by using equimolar quantities.

It is preferred that the ammonium, potassium and sodium salts of the various acids of phosphorus be used in the process of this invention. However, the other alkali metals are also suitable for the practice of this invention.

The esters of this invention can be prepared at reaction temperatures of from 0° C. to about 180° C. For example, some of the esters can be prepared by stirring the melted chloromethyl ether with a suitable alkali metal salt which has a melting point of under 180° C. It has been found that the reactants and ester products are stable up to about 180° C.

However, the preferred process embodiment involves the use of solvents during the reaction period. It has been found that acetonitrile is an excellent solvent which is generally applicable in the process. Acetone is another suitable solvent which may be advantageously used.

The reactions can be performed at from 0° C. to about 85° C. in the presence of the above solvents. However, as shown in the illustrative examples, excellent results are obtained at room temperature, and, consequently, the preferred temperature range is about 20° C. to 30° C.

The novel esters of this invention are useful as contact and systemic insecticides especially in the area of plant protection. They can be mixed with suitable inert diluents and then advantageously applied as powders, suspensions, solutions or in the form of emulsions.

The esters of this invention in which the group Y in structural Formula I contains an alkyl substituent having 12 to 18 carbon atoms have special utility as additives to lubricating oils. They are readily soluble in such oils, and it has been found that these compounds greatly increase the film strength of the composite oil mixture resulting in oils useful as extreme-pressure lubricants. It is believed that their effectiveness in this area may be attributed to the plurality of phosphorus-sulfur linkages therein which helps to bind the lubricating oils firmly to metal surfaces and thus prevents metal to metal contact.

What is claimed is:

1. An organic phosphorus compound having the following structural formula

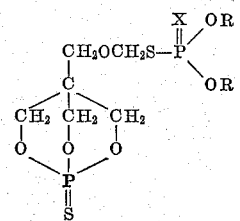

wherein X is selected from the group consisting of oxygen and sulfur and R is an alkyl group containing up to 18 carbon atoms.

2. An organic phosphorus compound having the following structural formula.

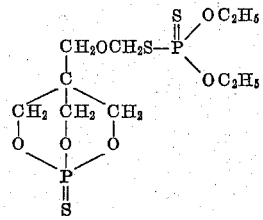

3. An organic phosphorus compound having the following structural formula.

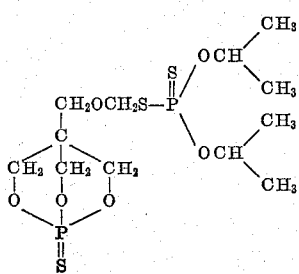

4. An organic phosphorus compound having the following structural formula.

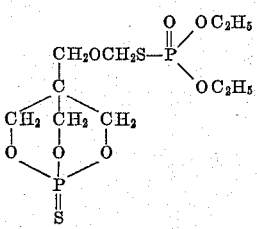

5. An organic phosphorus compound having the following structural formula.

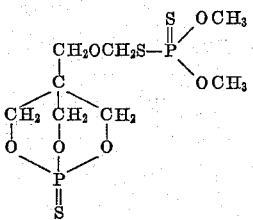

6. A process for preparing phosphorus-containing esters which comprises reacting a chloromethyl ether of 1-hydroxymethyl-4-phospha - 3,5,8 - trioxabicyclo[2.2.2]octane-4-sulfide at a temperature range of 0° C. to about 180° C. with a salt having the structure

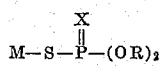

where M is an alkali metal, X is selected from the group consisting of oxygen and sulfur, and R is an alkyl group having up to 18 carbon atoms.

7. The proces of claim 6 wherein R in said salt is a lower alkyl group and the reaction is carried out in an inert organic solvent.

8. The process of claim 7 wherein a reaction temperature of 0° C. to about 85° C. is utilized.

References Cited by the Examiner
UNITED STATES PATENTS

| | | | |
|---|---|---|---|
| 2,752,283 | 6/56 | Metivier | 260—461 |
| 2,758,115 | 8/56 | Lorenz | 260—461 |
| 2,908,604 | 10/59 | Godfrey et al. | 260—461 |
| 3,028,302 | 4/62 | Chupp | 260—461 |
| 3,038,001 | 6/62 | Wadsworth | 260—461 |

CHARLES B. PARKER, *Primary Examiner.*

IRVING MARCUS, *Examiner.*